United States Patent Office 3,546,127
Patented Dec. 8, 1970

3,546,127
FLUORESCENT PENETRANT FOR AND METHOD
OF DETECTING SURFACE DISCONTINUITIES
Adolf Mlot-Fijalkowski, Elmwood Park, Ill., assignor to
Magnaflux Corporation, Chicago, Ill., a corporation of
Delaware
No Drawing. Filed Nov. 24, 1967, Ser. No. 685,252
Int. Cl. C09k 1/00
U.S. Cl. 252—301.2         1 Claim

ABSTRACT OF THE DISCLOSURE

A colored fluorescent liquid penetrant for and method of detecting surface discontinuities in test pieces in which the penetrant is oil-based and contains a sufficient proportion of aromatic hydrocarbon solvents and/or other good solvents to dissolve a high content of the principal dye that is used in the penetrant. The principal dye is an isomer of a styryl-substituted naphthoxazole, the substitution being in the beta position of the styryl radical. This particular dye has exceptional fluorescent brightness, especially when combined with solvents that have a yellowing effect and with yellow dyes capable of cascading therewith, and exceptional stability toward untraviolet radiations and heat.

BACKGROUND OF THE INVENTION

While it has been known to employ two or more dyes in a fluorescent penetrant to achieve a cascading effect (Switzer Pat. No. 2,920,203), the dyes used did not have so high a degree of fluorescent brightness nor so great stability toward ultraviolet radiation and heat as does the principal dye employed in my present fluorescent penetrant. The fluorescent brightness of the penetrant compositions similar to the present composition but not containing the principal dye herein used was, for example, only 92.5% of that of the preferred penetrant of my present invention and after fading under ultraviolet (black) light was only 71% of the brightness of my preferred penetrant after exposure to the same amount of ultraviolet light of the same wave length and intensity. The improved results are due to the use in my present penetrant of a principal dye consisting of styryl-substituted naphthoxazole, substitution being in the beta position of the styryl radical, in combination with yellow dyes having with the principal dye a cascading effect. The term "cascading effect" is used in the same sense and with the same connotation as in the aforesaid Switzer patent.

SUMMARY OF THE INVENTION

The fluorescent liquid penetrant of my invention comprises a liquid vehicle having a sufficient proportion of aromatic hydrocarbon solvents and/or other good solvents for the principal dye so as to be capable of completely dissolving, in high concentrations up to 25% by weight of the principal dye, which is a styryl-substituted naphthoxazole, and the dyes associated therewith to achieve a cascading effect. While aliphatic hydrocarbons can be present, the resulting admixture is sufficiently aromatic in character to enhance the fluorescent brightness of the penetrant over that obtainable by the use of only aliphatic hydrocarbons. Preferably, high-flash point hydrocarbons, e.g. 130° F. and higher in a closed cup are selected, but where the flash point is not significant, other solvents can be used, either alone or in admixture, such as toluene.

An especially good solvent for the principal dye is benzyl alcohol, but methyl ethyl ketone (MEK), dimethyl phthalate, dimethyl formamide (DMF), tetrahydrofurfuryl alcohol and others are satisfactory.

Preferably, the penetrant also contains another good solvent for the dyes, usually employed as a plasticizer, such as Santicizer 8, which is a mixture of o- and p-toluene ethyl sulfonamide, Santicizer 141, which is an alkyl aryl ether of phosphoric acid; dioctylphthalate (DOP); or other, preferably, relatively non-volatile liquids having a dissolving or solvating effect toward the dyes and miscible with the liquid aromatic hydrocarbon vehicle.

In addition to the principal dye, which has a whitish blue fluorescence, dyes having a yellow fluorescence can be used, such as Fluorol 7 GA, a naphthalimide, fluorescent oil-soluble dye. The principal dye is a styryl-substituted naphthoxazole which can be used as the only dye. This dye has a light tan appearance, when dry; has a melting point of 125° to 127° C.; and is insoluble in water but is soluble in the following solvents expressed in grams/100 ml. of solvent, at 25° C.:

| | |
|---|---|
| Toluene | 12.2 |
| MEK | 13.3 |
| DOP | 4.8 |
| DMP | 8.2 |
| Tetrahydrofurfuryl alcohol | 8.7 |
| Benzyl alcohol | 16.6 |

PREFERRED EMBODIMENT OF THE INVENTION

A preferred formula for my fluorescent liquid penetrant is the following:

FORMULA NO. 1

| | Lbs. | Percent by weight |
|---|---|---|
| Santicizer 141 | 460 | 50.0 |
| Solvent D-74 | 240 | 26.2 |
| Sunthene 310 | 115 | 12.5 |
| Benzyl alcohol | 50 | 5.4 |
| Styryl-substituted naphthoxazole | 44 | 4.8 |
| Hudson yellow | 10 | 1.1 |
| Total | 919 | 100 |

Optionally, the penetrant of the above formula can contain Emcol 511, or 61, 30 lbs. or 33% by weight to give a total of approximately 949 lbs.

Solvent D-74 is an aromatic hydrocarbon having a K.B. value of 150 that is available as a "heavy aromatic" from Technical Petroleum Company, Chicago. Other satisfactory aromatic hydrocarbons are:

| | K.B. value |
|---|---|
| Hi-Sol 4–3 | 93 |
| Hi-Sol 4–2K | 150 |
| Hi-Sol Number 3 | 70 |
| Hi-Sol Number 70 | 72 |
| Hi-Sol Number 15 | 92 |
| Aromatic Solvent T | 62 |

"K.B." is the abbreviation for Kauri Butanol value expressed in cc.

The Hi-Sol hydrocarbons are available as the proprietary products of Bronoco Solvents and Chemicals, a division of Ashland Oil and Refining Company, St. Louis, Mo. Aromatic Solvent T is a proprietary product of Hess Petrochemical Division of Hess Oil and Chemical Corporation, New York, N.Y. Sunthene 310 is a rubber process and extender oil, available as a proprietary product of Sun Oil Company.

The Emcol products are alkanolamides put out by Witco Chemical Company. Emcol 61 is an oil-soluble alkanolamide, which is believed to be an isopropanolamide of oleic acid, and Emcol 511 is also an oil-soluble alkanolamide. Both are hydrophobic surfactants.

In any fluorescent liquid penetrant embodying my invention the principal dye can be varied between 1% and 25%, with about 5% the average, by weight of the total penetrant composition.

As substitutes for Hudson Yellow, a similar fluorescent dye, known as Fluorol 7 GA, or Fluorol 5 GA, proprietary products of General Dyestuffs division of General Aniline & Film Company; and other dyes or sensitizers that fluoresce yellow can be used within their limits as to solubility, in addition to the principal dye, in the same percentage or within the percentage range (1 to 25% by weight), the same as the principal dye.

In place of benzyl alcohol, the following may be used:

Toluene
MEK, methyl ethyl ketone
DOP, dioctyl phthalate
DMP, dimethyl phthalate
Tetrahydrofurfuryl alcohol In its broader aspects, the fluorescent penetrant comprises a solution of styryl-substituted naphthoxazole as the principal fluorescent dye in a liquid hydrocarbon in concentration of between 1% and 25% by weight. The liquid penetrant vehicle should be aromatic in character to take advantage of the greater solubility of aromatic hydrocarbons toward this particular dye, and the enhanced fluorescent brightness of the penetrant as compared with that of aliphatic hydrocarbon solutions of the same dye. As indicative of the aromatic character of the hydrocarbon liquids that have been found suitable as the liquid vehicle for my fluorescent penetrant, the liquid vehicle should have a K.B. value of about 60 or higher.

The liquid vehicle can be any of the water-immisible liquid aromatic hydrocarbons used as penetrants for the post-emulsification process described and claimed in Pat. No. 2,806,959, such as Sovaloid C, an alkylated aromatic petroleum compound having a minimum aromatic content of 98%; and a partially hydrogenated terphenyl product, probably largely 1,4-diphenyl benzene. The liquid vehicle, for best penetrating properties, is non-water-miscible, of low viscosity, not itself emulsified, and itself free from any added emulsifier. It should have a relatively low vapor pressure and a relatively high flash point, e.g., 130° F. closed cup, to minimize fire hazards, and it should be relatively non-toxic.

Solvents that are miscible with the aromatic hydrocarbon or mixture of hydrocarbons and that are particularly good solvents for the principal dye can be used to increase the effectiveness of the aromatic type hydrocarbons. Such "good solvents" include those previously mentioned as solvents for the principal dye, of which benzyl alcohol and MEK are most satisfactory. Santicizer 141 is also an excellent solvent for the principal dye and except for being relatively expensive, can be used within the proportions of between 10 and 90% of the total liquid vehicle, as could also any of the other "good solvents."

A generic formula for my penetrant, then, is the following:

FORMULA NO. 2

| | Percent by weight |
|---|---|
| Principal dye | 1 to 25 |
| Hudson Yellow or Fluorol 7 GA | 1 to 25 |
| "Good solvent," e.g., benzyl alcohol | 0 to 80 |
| Aromatic type hydrocarbon (having a K.B. value of about 60 and over) | 20 to 90 |

A more preferred range is illustrated by the following formula:

FORMULA NO. 3

| | Percent by weight |
|---|---|
| Principal dye | 4 to 6 |
| Hudson Yellow or Fluorol 7 GA | 1 to 2 |
| Benzyl alcohol | 5 to 10 |
| Santicizer 141 | 40 to 50 |
| Aromatic type hydrocarbons | Balance |

As the concentration of dyes is increased toward their upper limits the amount of benzyl alcohol or other "good solvents" should be increased to obtain greater solvency toward the dyes and enable the use of a concentration of dyes giving the optimum fluorescent brightness.

As previously stated, the use of dyes having a yellow fluorescence, such as Fluorol 7 GA, gives a cascading effect with the principal dye that is particularly desirable. However, dyes having a bluish fluorescence, such as 4-methyl-7-dimethylamine-coumarin (MDAC),) Columbia Blue and others can be used with the principal dye.

The principal dye is a styrene derivative of naphthoxazole, preferably, 2-styrylnaphth [1,2d] oxazole having the structural formula:

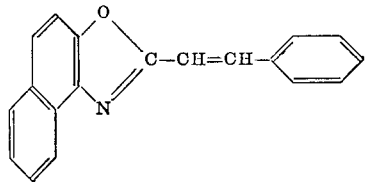

or an isomer thereof.

If the principal dye is available only as a wet presscake having an active dye content of, say up to 65%, or more, the presscake can be dried and used as such on the basis of its dye content, or the dye can be purified by recrystallization and used in its pure or substantially pure form in the proportions above specified.

It will be understood that modifications and variations may be effected without departing from the scope of the novel concepts of the present invention.

I claim:
1. In a penetrant inspection method of detecting surface discontinuities in a test piece by the use of a fluorescent penetrant, the step of applying to said surface, as the penetrant,
a non-water-miscible liquid vehicle having a principal fluorescent dye dissolved therein selected from the group consisting of 2-styrylnaphth [1,2d] oxazole and its isomers, and an anmount of aromatic hydrocarbons in said vehicle sufficient to impart to said vehicle a Kauri Butanol value of at least 60 and to dissolve said principal dye unaided by other constituents of said vehicle,
the fluorescent brightness of said penetrant being greater than that obtainable by the use of only aliphatic hydrocarbon solvents for dissolving said principal dye in the same concentration.

References Cited

UNITED STATES PATENTS

| 2,259,400 | 10/1941 | Switzer | 250—71 |
| 2,920,203 | 1/1960 | Switzer et al. | 250—71 |
| 3,262,929 | 7/1966 | Okubo et al. | 260—240 |
| 3,274,184 | 9/1966 | Thompson et al. | 260—240 |
| 3,341,529 | 9/1967 | Buell | 260—240 |

TOBIAS E. LEVOW, Primary Examiner

A. P. DEMERS, Assistant Examiner

U.S. Cl. X.R.

73—104; 250—71